US010500752B2

(12) United States Patent
Nawrodt et al.

(10) Patent No.: US 10,500,752 B2
(45) Date of Patent: Dec. 10, 2019

(54) METHOD AND DEVICE FOR DISPOSING OF A SLUG PRODUCED IN A HOLE PUNCHING OPERATION ON A HOLLOW PROFILE

(71) Applicant: JENOPTIK Automatisierungstechnik GmbH, Jena (DE)

(72) Inventors: Sebastian Nawrodt, Jena (DE); Karsten Heinig, Gera (DE); Roland Hennig, Jena (DE); Christoph Steiner, Jena (DE)

(73) Assignee: JENOPTIK Automatisierungstechnik GmbH, Jena (DE)

( * ) Notice: Subject to any disclaimer, the term of this patent is extended or adjusted under 35 U.S.C. 154(b) by 1315 days.

(21) Appl. No.: 14/189,312

(22) Filed: Feb. 25, 2014

(65) Prior Publication Data

US 2014/0238962 A1 Aug. 28, 2014

(30) Foreign Application Priority Data

Feb. 25, 2013 (DE) .......................... 10 2013 003 118

(51) Int. Cl.
*B23K 7/00* (2006.01)
*B26D 7/18* (2006.01)
*B26F 1/00* (2006.01)
*B26F 1/02* (2006.01)
*B21D 28/24* (2006.01)
(Continued)

(52) U.S. Cl.
CPC ............... *B26D 7/18* (2013.01); *B21D 28/28* (2013.01); *B23K 26/16* (2013.01); *B23K 26/38* (2013.01); *Y10T 83/0495* (2015.04); *Y10T 83/207* (2015.04); *Y10T 83/22* (2015.04)

(58) Field of Classification Search
CPC .......... B23K 26/38; B23K 7/006; B26D 7/18; B21D 28/243; B21D 28/28; B21D 43/282; B21D 28/02; B21D 28/10; B21D 28/14; B21D 28/145; B21D 28/16; B21D 28/24; B21D 28/34
USPC ............ 219/121.71, 121.68, 121.41, 121.39, 219/121.67, 121.18, 121.2; 72/324–339
See application file for complete search history.

(56) References Cited

U.S. PATENT DOCUMENTS 4,644,128 A 2/1987 Palentyn et al.
4,679,289 A * 7/1987 Miller .................... B21D 22/04
29/33 T
(Continued)

FOREIGN PATENT DOCUMENTS

DE 36 37 204 A1 5/1988
DE 36 37 204 C2 5/1988
(Continued)

*Primary Examiner* — Tu B Hoang
*Assistant Examiner* — Alba T Rosario-Aponte
(74) *Attorney, Agent, or Firm* — Muncy, Geissler, Olds & Lowe, P.C.

(57) ABSTRACT

A method for disposing of a slug produced in a hole punching operation on a hollow profile is provided. The method includes the steps of providing a hollow profile; cutting at least one predeterminable hole or slug contour path into the hollow profile by means of a cutting device; leaving a residual web of the hole or slug contour path; moving a receiving device into the hollow profile; moving a punch from a first position into a residual-web-removing second position in such a way that the slug thereby produced is received by the receiving device; and moving the receiving device out of the hollow profile.

9 Claims, 3 Drawing Sheets

(51) Int. Cl.
*B21D 28/28* (2006.01)
*B21D 43/28* (2006.01)
*B23K 26/00* (2014.01)
*B23K 26/16* (2006.01)
*B23K 26/38* (2014.01)
*B23K 101/04* (2006.01)

(56) References Cited

U.S. PATENT DOCUMENTS

| | | | |
|---|---|---|---|
| 4,797,531 A | 1/1989 | Otto et al. | |
| 5,666,840 A * | 9/1997 | Shah | B21D 28/28 72/336 |
| 5,839,336 A * | 11/1998 | Yamauchi | B26D 1/06 355/408 |
| 5,996,455 A | 12/1999 | Haag et al. | |
| 6,003,418 A * | 12/1999 | Bezama | B23Q 11/006 83/100 |
| 6,067,830 A * | 5/2000 | Klages | B21D 26/035 29/421.1 |
| 7,992,475 B2 * | 8/2011 | Buettner | B21D 28/06 219/121.72 |

FOREIGN PATENT DOCUMENTS

| | | |
|---|---|---|
| DE | 39 37 460 A1 | 11/1990 |
| DE | 42 02 984 A1 | 8/1993 |
| DE | 196 47 962 C1 | 4/1998 |
| DE | 198 59 925 A1 | 6/2000 |
| DE | 198 59 925 C2 | 6/2000 |
| DE | 10 2005 033 493 B3 | 9/2006 |
| FR | 2 459 693 A1 | 1/1981 |
| JP | S 58-125320 A | 7/1983 |
| JP | H 02-274328 A | 11/1990 |
| WO | WO 98/55244 A1 | 12/1998 |

* cited by examiner

METHOD AND DEVICE FOR DISPOSING OF A SLUG PRODUCED IN A HOLE PUNCHING OPERATION ON A HOLLOW PROFILE

This nonprovisional application claims priority under 35 U.S.C. § 119(a) to German Patent Application No. DE 10 2013 003 118.4, which was filed in Germany on Feb. 25, 2013, and which is herein incorporated by reference.

BACKGROUND OF THE INVENTION

Field of the Invention

The present invention relates to a method for disposing of a slug produced in a hole punching operation on a hollow profile and to a device for carrying out this method.

Description of the Background Art

The prior art discloses, for example in DE 42 02 984 A1, a method for disposing of slugs in the robot-guided laser cutting of holes in thin-walled sheet-metal parts, in which method, before beginning the process of travelling around the hole or slug contour path, the slug to be cut out is provided with a gripping hole, which is produced by burning out by means of a laser beam that does not impinge on the hole contour path and into which a gripping tool is introduced at a point in time at which the gripping hole is accessible for this but the slug has not yet been cut out completely, and the gripping tool keeping hold of the slug until it is deposited in a container.

Furthermore, DE 39 37 460 A1 discloses a method for making openings in a hollow profile by means of a laser device. In order to dispose of the slug produced in the laser cutting process, the hollow profile is flowed through by a bubble-free liquid. The material burned out from the kerf by the laser beam and the slug freed from the outlet opening are caught up in the liquid, cooled down and swept away. The liquid may for example be water. A disadvantage of this method is that, with tapering or slightly curved hollow profiles, there is the risk of the removed slug catching on the tapering part in the hollow profile and consequently not being swept away.

SUMMARY OF THE INVENTION

It is therefore an object of the present invention to provide an improved method that is reliable in terms of the process and avoids the disadvantages mentioned.

In an embodiment of the invention, a method for disposing of a slug produced in a hole punching operation on a hollow profile has the following features: providing a hollow profile; cutting at least one predeterminable hole or slug contour path into the hollow profile by means of a cutting device; leaving a residual web of the hole or slug contour path; moving a receiving device into the hollow profile; moving a punch from a first position into a residual-web-removing second position in such a way that the slug thereby produced is received by the receiving device; moving the receiving device out of the hollow profile. A receiving device according to the invention, which during the method moves into and out of the hollow profile in order to receive the slug or slugs, consequently ensures the disposal of all of the slugs produced in a cutting operation.

In an embodiment, the step of moving the receiving device out of the hollow profile can be performed in the second position of the punch. In other words: while the receiving device is moving out of the hollow profile, the opening created by the punch is closed by the punch. It is consequently ensured that no slugs leave the hollow profile through the opening created.

In a further embodiment, the receiving device can be controlled by a first control device and the moving-in step also comprises the feature that the receiving device is controlled by the first control device in such a way that it is positioned above and/or below a hole or slug contour path. It is consequently ensured by the control device that the receiving device is aligned positionally correctly for receiving a slug.

In a further embodiment, after the moving out of the receiving device, the at least one slug is removed from the receiving device, in particular extracted by suction.

In a further embodiment, the number of slugs removed is detected by a detector unit and compared with a number of predetermined hole or slug contour paths. With such a detector unit, it can consequently be established whether all of the slugs cut out from the hollow profile have been removed.

A further embodiment provides that a cutting step comprises the cutting of at least two diametrically opposed hole or slug contour paths and a first punch is moved from a first position into a second position, removing a first residual web of a first hole or slug contour path, in such a way that the first slug thereby produced is received on an upper side of the receiving device, and a second punch is moved from a first position into a second position, removing a second residual web of a second hole or slug contour path, in such a way that the second slug thereby produced is received on an underside of the receiving device. With such an embodiment, it is possible to insert a bushing or similar elements into the diametrically opposed openings.

In a further embodiment, the cutting device can be controlled by a second control device, to be precise in such a way that the step of leaving the residual web is brought about in such a way that, in an end region, the hole or slug contour path leads away from the rest of the hole or slug contour.

In a further embodiment, the method is used in one or both end regions of the hollow profile. In such a region, the receiving device controlled by the control device can be moved into the hollow profile particularly easily.

The invention also relates to a device for carrying out the method according to the invention with the following features: a cutting device, in particular a laser device, for cutting a predeterminable hole or slug contour path into the hollow profile; a receiving device for receiving a slug cut out at least in certain regions by means of the cutting device and removed from the rest of the hollow profile by means of a punch; a first control device for controlling the receiving device; a second control device for controlling the cutting device; and a third control device for controlling the at least one punch.

In an embodiment, the receiving device has at least one receiving recess for receiving the at least one slug. It is consequently ensured that the at least one slug is not thrown out of the receiving device during transport.

In a further embodiment, the receiving device is, at least in certain regions, formed from plastic or metallically, in particular magnetically. Consequently, a receiving device that can be produced particularly easily and at low cost is provided. Moreover, a receiving device that is magnetic at least in certain regions allows a receiving device that is even more reliable in terms of the process to be provided.

In a further embodiment, the at least one punch is formed in a wedge-shaped manner. Such a form of the punch allows slugs to be cut out from the hollow profile particularly advantageously.

In a further embodiment, the outer contour of the receiving device is adapted at least in certain regions to the inner contour of the hollow profile. Such a form of the receiving device has the effect of preventing the received slugs from being able to fall out of the hollow profile from the receiving recesses during transport and remaining in the hollow profile.

In a further embodiment, the device also comprises a suction extraction unit for extracting the at least one slug from the receiving device.

The embodiments just described can be implemented on their own or in combination with one another.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1B:
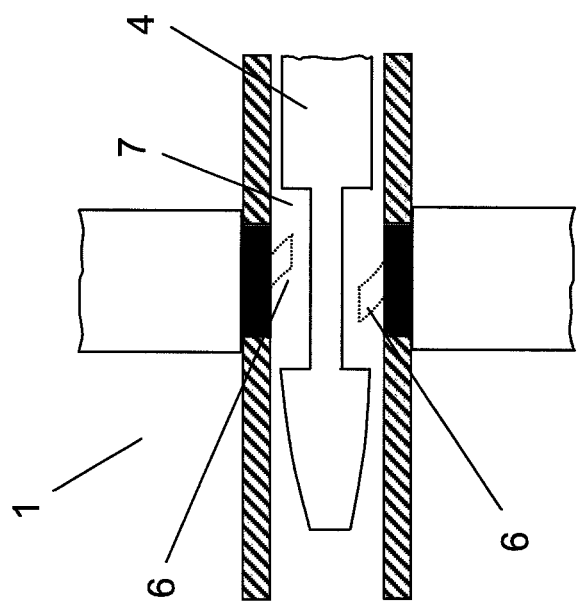
FIG. 1b shows a schematic setup of a method according to an embodiment of the invention for disposing of a slug produced in a hole punching operation on a hollow profile, a punch being located in a second, residual-slug-removing position.
Figure 1A:
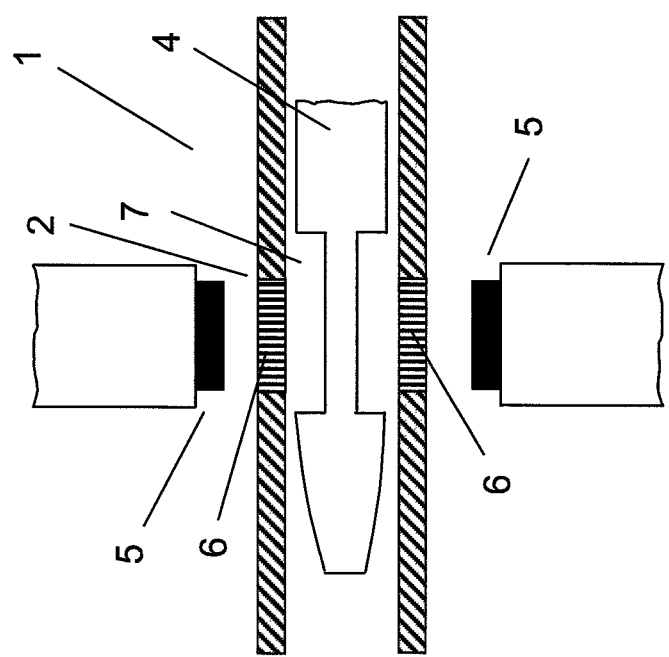
FIG. 1a shows a schematic setup of a method according to an embodiment of the invention for disposing of a slug produced in a hole punching operation on a hollow profile, a punch being located in a first position.

FIG. 1a and FIG. 1b show in combination the basic principle of a method according to the invention for disposing of a slug 6 produced in a hole punching operation on a hollow profile 1. The hollow profile may be, for example, a transverse member of a motor vehicle. For receiving bushings in the transverse member, openings are required and these can be provided by the method according to the invention.

Figure 2:
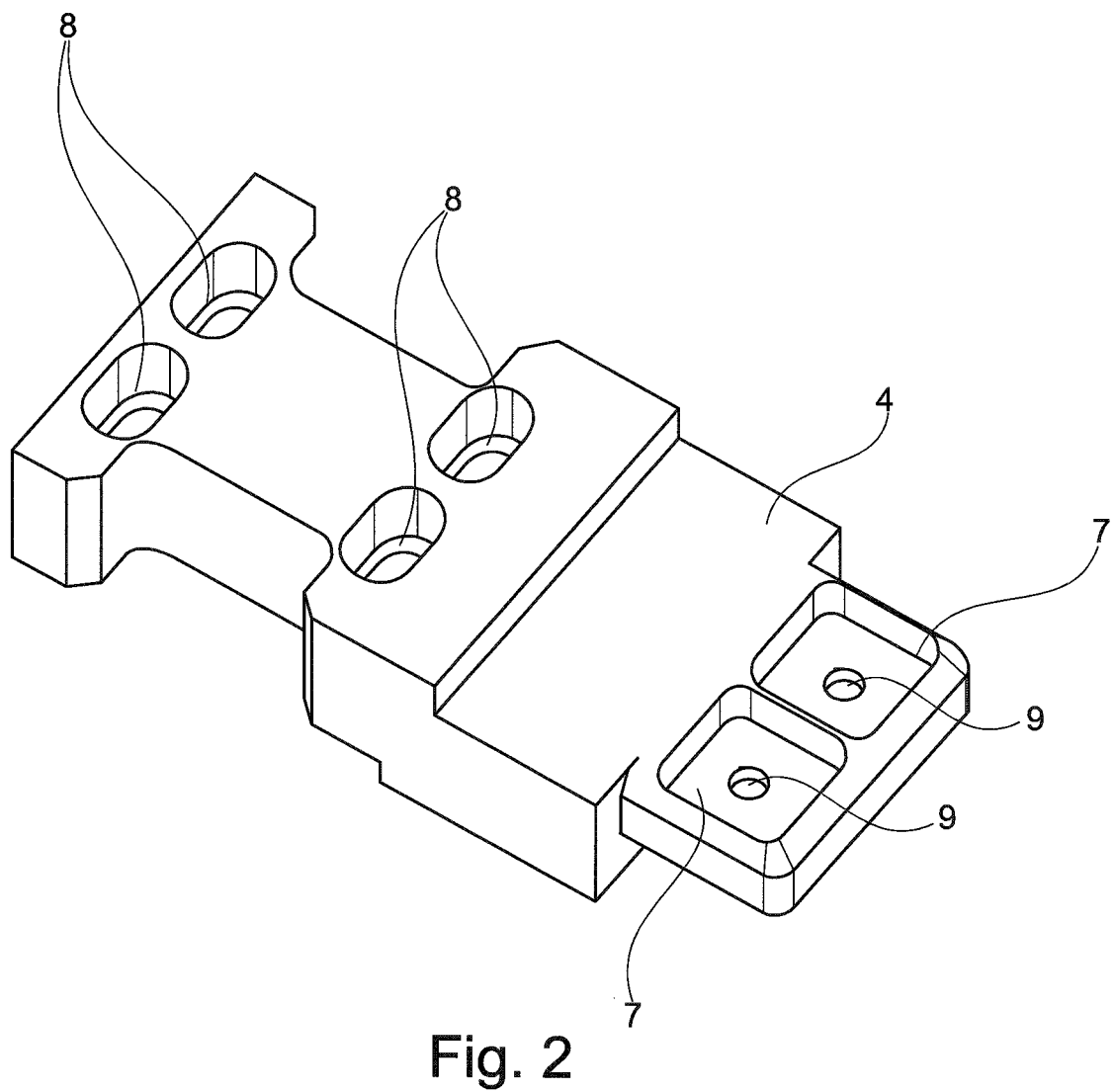
FIG. 2 shows a perspective view of a receiving device for removing the slug from the hollow profile.

A receiving device 4, which is designed to allow it to be moved into the hollow profile is provided. Provided for this purpose is a first control device, which is not represented any more specifically, controls the movement of the receiving device and moves to a predeterminable position in the hollow profile. The receiving device 4, which is also represented once again in a perspective view in FIG. 2, is connected here non-positively to the control device (not represented) by way of bores 8.

The method according to an exemplary embodiment of the invention thus operates as follows. Firstly, in a first method step, a hole or slug contour path 2 is cut into the hollow profile 1 by means of a cutting device that is not represented any more specifically. The cutting device may be, for example, a laser device. However, other cutting devices are also conceivable. The cutting device is controlled by a second control device, which is likewise not represented any more specifically.

Figure 3B:
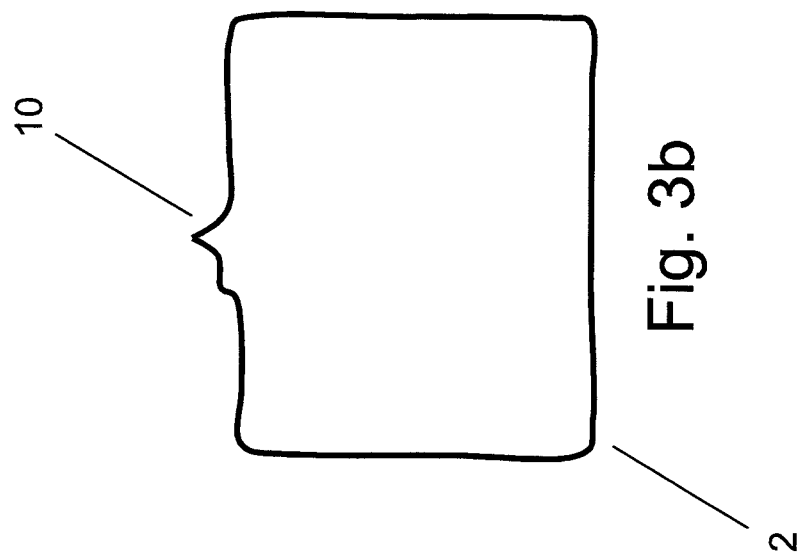
FIG. 3b shows a schematic diagram of the opening created, after the residual web has been removed.
Figure 3A:
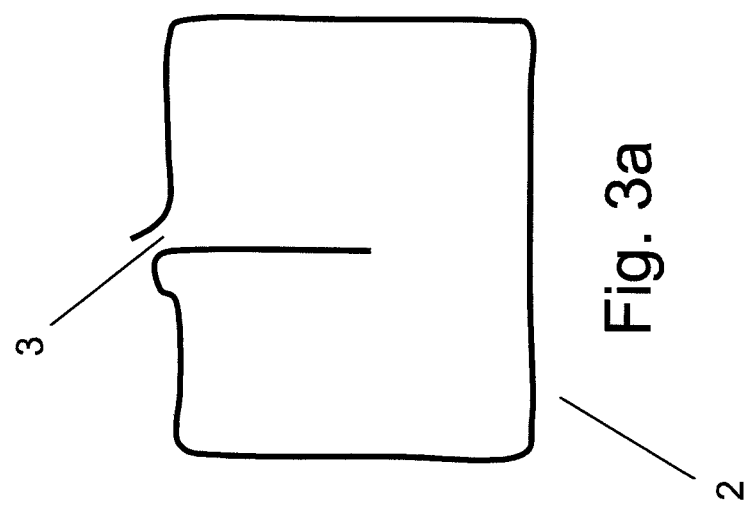
FIG. 3a shows a schematic diagram of a hole or slug contour path according to the invention.

It is important in this connection that the cutting device does not cut a continuous hole or slug contour path 2 into the hollow profile, but is controlled in such a way that a residual web 3 remains (see FIG. 3a). This residual web 3 serves the purpose that the slug 6 to be cut out from the hollow profile initially remains in its starting position. A hole or slug contour path according to the invention can be seen in FIG. 3a.

In a second method step, the receiving device is then moved into the hollow profile, as already explained above, and, according to FIG. 1a, positioned underneath a hole or slug contour path cut with the cutting device. The receiving device has a receiving recess 7, which is designed to receive one or more slugs. For example, the receiving device 4 may have two receiving recesses 7 on each of both sides, as represented in a perspective view in FIG. 2. It is consequently possible to transport a total of four slugs out of the hollow profile.

In a third method step, subsequently a punch 5 is moved out of a first position by means of a third control device into a second position, to be precise in such a way that the still remaining residual web 3 is also separated from the hollow profile 1. Consequently, the slug 6 thereby produced falls into the receiving recess 7 of the pre-positioned receiving device 4. As can be seen in FIG. 3a, at its end in the region of the web 3, the hole or slug contour path 2 leads away from the rest of the contour path.

Consequently, after the slug has been removed from the hollow profile by the punch, an outwardly pointing lug 10 is created. Such a contour path has the advantage that bushings or other elements can be inserted into the openings without inwardly protruding lugs hindering this insertion or even making it impossible.

In a fourth method step, the receiving device 4 is moved out from the hollow profile 1. According to the invention, it is provided here that this method step is performed in the second position of the punch according to FIG. 3b.

In a final, fifth method step, the slugs are extracted from the respective receiving recesses by being sucked or blown out. For this, additional openings 9 may be provided in the receiving recesses 7. The slugs that have been received on an underside of the receiving device by corresponding receiving recesses 4 are already removed by the gravitational force when the receiving device is moved out from the hollow profile 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for disposing of a slug produced in a hole punching operation on a hollow profile, the method comprising:
   providing a hollow profile;
   cutting at least one predeterminable, non-continuous contour path into the hollow profile via a cutting device;
   leaving a residual web between a first end region of the contour path and a second end region of the contour path;
   moving a receiving device into the hollow profile;
   moving a first punch from a first position into a residual-web-removing second position such that a first slug thereby produced is received by the receiving device; and
   moving the receiving device out of the hollow profile,
   wherein the first end region of the contour path extends away from the first slug, and wherein the second end region of the contour path extends within the first slug, the contour path defining at least a portion of a perimeter of the slug.

2. The method according to claim 1, wherein the step of moving the receiving device out of the hollow profile is performed in the second position of the first punch.

3. The method according to claim 1, wherein the moving of the receiving device further comprises positioning the receiving device above or below the at least one contour path.

4. The method according to claim 1, wherein, after moving the receiving device out of the hollow profile, the first slug is removed from the receiving device.

5. The method according to claim 1, wherein a number of slugs removed is detected and compared with a number of predetermined contour paths.

6. The method according to claim 1, wherein the cutting step comprises the cutting of at least two diametrically opposed contour paths and is performed in that the first punch is moved from the first position into a second position, removing a first residual web of a first contour path, such that the first slug thereby produced is received on an upper side of the receiving device, and a second punch is moved from a first position into a second position, removing a second residual web of a second contour path, such that a second slug thereby produced is received on an underside of the receiving device.

7. A method for disposing of a slug produced in a hole punching operation on a hollow profile, the method comprising:
   providing a hollow profile;
   cutting at least two predeterminable, non-continuous hole or slug contour paths into the hollow profile on opposing sides of the hollow profile via a cutting device;
   leaving a residual web through each hole or slug contour path;
   moving a receiving device into the hollow profile;
   moving a punch for each hole or slug contour path from a first position into a residual-web-removing second position such that slugs produced by punching of the opposing side are received together by the receiving device; and
   moving the receiving device out of the hollow profile.

8. The method according to claim 7, wherein each of the hole or slug contour paths has a first end along a side of a prospective hole and a second end within a prospective slug.

9. The method according to claim 7, wherein the step of cutting extends one end of each of the hole or slug contour paths cut in the hollow profile into a slug portion which is ultimately removed.

* * * * *